(12) United States Patent
Murakami et al.

(10) Patent No.: US 7,936,372 B2
(45) Date of Patent: May 3, 2011

(54) IMAGE PROCESSING METHOD AND SYSTEM FOR GENERATING AND ANALYZING METADATA AND SERVER FOR SUCH SYSTEM

(75) Inventors: Miki Murakami, Tokyo (JP); Masaki Demizu, Kanagawa (JP)

(73) Assignee: Sony Corporation (JP)

( * ) Notice: Subject to any disclaimer, the term of this patent is extended or adjusted under 35 U.S.C. 154(b) by 959 days.

(21) Appl. No.: 11/824,104

(22) Filed: Jun. 28, 2007

(65) Prior Publication Data

US 2008/0016541 A1    Jan. 17, 2008

(30) Foreign Application Priority Data

Jun. 30, 2006 (JP) ................................. P2006-182820

(51) Int. Cl.
*H04N 5/225* (2006.01)
*H04H 60/33* (2008.01)

(52) U.S. Cl. ........................................ 348/207.1; 725/9
(58) Field of Classification Search .................. 348/143, 348/152, 207.1, 207.11, 211.99, 211.1, 211, 348/4, 11, 231.99; 725/9, 10, 14
See application file for complete search history.

(56) References Cited

U.S. PATENT DOCUMENTS

| | | |
|---|---|---|
| 2002/0036804 A1 | 3/2002 | Taniguchi et al. |
| 2005/0122397 A1* | 6/2005 | Henson et al. ................ 348/143 |
| 2005/0169367 A1 | 8/2005 | Venetianer et al. |
| 2006/0001537 A1 | 1/2006 | Blake et al. |
| 2008/0117295 A1* | 5/2008 | Ebrahimi et al. ............. 348/143 |
| 2008/0297599 A1* | 12/2008 | Donovan et al. ............. 348/143 |

FOREIGN PATENT DOCUMENTS

| | | |
|---|---|---|
| EP | 1073223 A1 | 1/2001 |
| JP | 2002-165210 A | 6/2002 |
| JP | 2003-134435 A | 5/2003 |
| JP | 2003-274390 A | 9/2003 |
| JP | 2004-247844 A | 9/2004 |

OTHER PUBLICATIONS

European Search Report, EP 07111245, dated Oct. 15, 2009.

* cited by examiner

*Primary Examiner* — Kelly L Jerabek
(74) *Attorney, Agent, or Firm* — Lerner, David, Littenberg, Krumholz & Mentlik, LLP (57) ABSTRACT

Disclosed herein is an image processing system including, an image pickup device, a server and a terminal apparatus, wherein said image pickup device including, a video data generating section and a metadata generating section wherein said server including, a video data storing section and a metadata storing section.

6 Claims, 6 Drawing Sheets

IMAGE PROCESSING METHOD AND SYSTEM FOR GENERATING AND ANALYZING METADATA AND SERVER FOR SUCH SYSTEM

CROSS-REFERENCE TO RELATED APPLICATIONS

The present application claims priority from Japanese Patent Application No. JP 2006-182820, filed in the Japanese Patent Office on Jun. 30, 2006, the entire content of which is incorporated herein by reference.

BACKGROUND OF THE INVENTION

1. Field of the Invention

The present invention relates to an image processing system for performing monitoring by using a plurality of image pickup devices, a server applied to the same, and an image processing method to which the same is applied, and more particularly to an image processing system using a plurality of devices each of which capable of generating metadata exhibiting information on video data as a plurality of image pickup devices.

2. Description of the Related Art

In a monitoring system of the related art, image pickup devices (video cameras), and monitors which can display thereon images corresponding to video data outputted from the image pickup devices, respectively, are connected to one another through a network. Thus, the monitors record therein images, respectively, thereby making it possible to confirm monitored images when an abnormal situation occurs. This monitoring system of the related art, for example, is described in Japanese Patent Laid-Open No. 2003-274390.

SUMMARY OF THE INVENTION

Now, in the case where the monitoring is performed with this sort of monitoring system, efficiency is poor when a monitoring person merely directly monitors a displayed image through his/her visual observation. In view of this respect, a system is developed which can detect an invader or occurrence of abnormality from a change in image itself. However, the monitoring system of the related art involves a problem that merely the monitoring complying with determined conditions that, for example, a frame (moving body frame) is displayed for a moving body existing in a monitored image can be carried out. Thus, it has been requested to develop a system which can perform the more advanced monitoring.

More specifically, for example, the apparatus in which information (metadata) on a monitored image delivered from a network camera is recorded analyzes the metadata, thereby producing a report about the monitored state. Therefore, it is difficult to simultaneously produce a large number of reports.

In the case of processing for displaying a moving body frame in an image with a system configuration for delivering metadata to a large number of client terminals via a server, all the client terminals perform the same metadata analysis. As a result, it is difficult to process the metadata in real time when the client terminal having a low performance exists.

In addition, even when the load balance changes, so that the loads concentrate on the server, or conversely the loads concentrate on a certain client terminal in the system in which the number of client terminals connected thereto, or the number of cameras connected thereto changes in real time, the system has is a tendency to concentrate the loads on a certain apparatus because it may be impossible to change the processing in such a case.

Moreover, when a large amount of metadata is analyzed, the server itself takes a lot of time to analyze the large amount of metadata.

The present invention has been made in the light of the foregoing, and it is therefore desirable to provide an image processing system which is capable of performing satisfactorily various forms of monitoring.

According to an embodiment of the present invention, there is provided an image processing system including an image pickup device, a server for storing therein video data outputted from the image pickup device, an image being captured with the image pickup device and being outputted in a form of the video data from the image pickup device, and a terminal apparatus to which the video data is transmitted from the server, the image pickup device including, a video data generating section for capturing an image, and generating video data on the image, and a metadata generating section for generating metadata representing information on an image of an object of monitoring, the server including, a video data storing section for storing therein the video data supplied from the image pickup device, and a metadata storing section for storing therein the metadata supplied from the image pickup device, in which the terminal apparatus outputs a result of an analysis about the metadata stored in the metadata storing section.

In the image processing system according to the embodiment of the present invention, the analysis about the monitored image the information on which is recorded can be performed at any time by utilizing the metadata stored in the server.

According to another embodiment of the present invention, there is provided a server for an image processing system for storing therein video data outputted from an image pickup device, an image being captured with the image pickup device and being outputted in a form of the video data from the image pickup device, and supplying the video data thus stored to a terminal apparatus, the server for an image processing system including, a video data storing section for storing therein the video data supplied from the image pickup device, a metadata storing section for storing therein metadata supplied from the image pickup device, and an analyzing section for analyzing the metadata stored in the metadata storing section, and supplying a result of an analysis about the metadata to the terminal apparatus.

According to still another embodiment of the present invention, there is provided an image processing method applied to a monitoring system including an image pickup device, a server for storing therein video data outputted from the image pickup device, an image being captured with the image pickup device and being outputted in a form of the video data from the image pickup device, and a terminal apparatus to which the video data is transmitted from the server, the image processing method including the steps of, capturing an image with the image pickup device, and generating metadata representing information on an object of monitoring by the image pickup device, storing video data and the metadata supplied from the image pickup device in the server, and outputting a result of an analysis about the metadata stored in the server in the terminal apparatus.

According to the embodiments of the present invention, by utilizing the metadata stored in the server, the analysis about the image the information on which is recorded can be performed at any time. In addition, the analysis based on the conditions set in the terminal apparatus can be freely performed. Also, the report or the like of the analysis result about the metadata can be obtained. For example, a plurality of terminal apparatuses are prepared, and the different analyses about the monitored image the information on which is stored can be performed in the plurality of terminal apparatuses, respectively. As a result, the monitoring efficiency is improved. In addition, it is possible to perform the analysis about the metadata corresponding to the ability of the server or the terminal apparatuses.

DETAILED DESCRIPTION OF THE PREFERRED EMBODIMENTS

A preferred embodiment of the present invention will be described in detail hereinafter with reference to the accompanying drawings.

Figure 1:
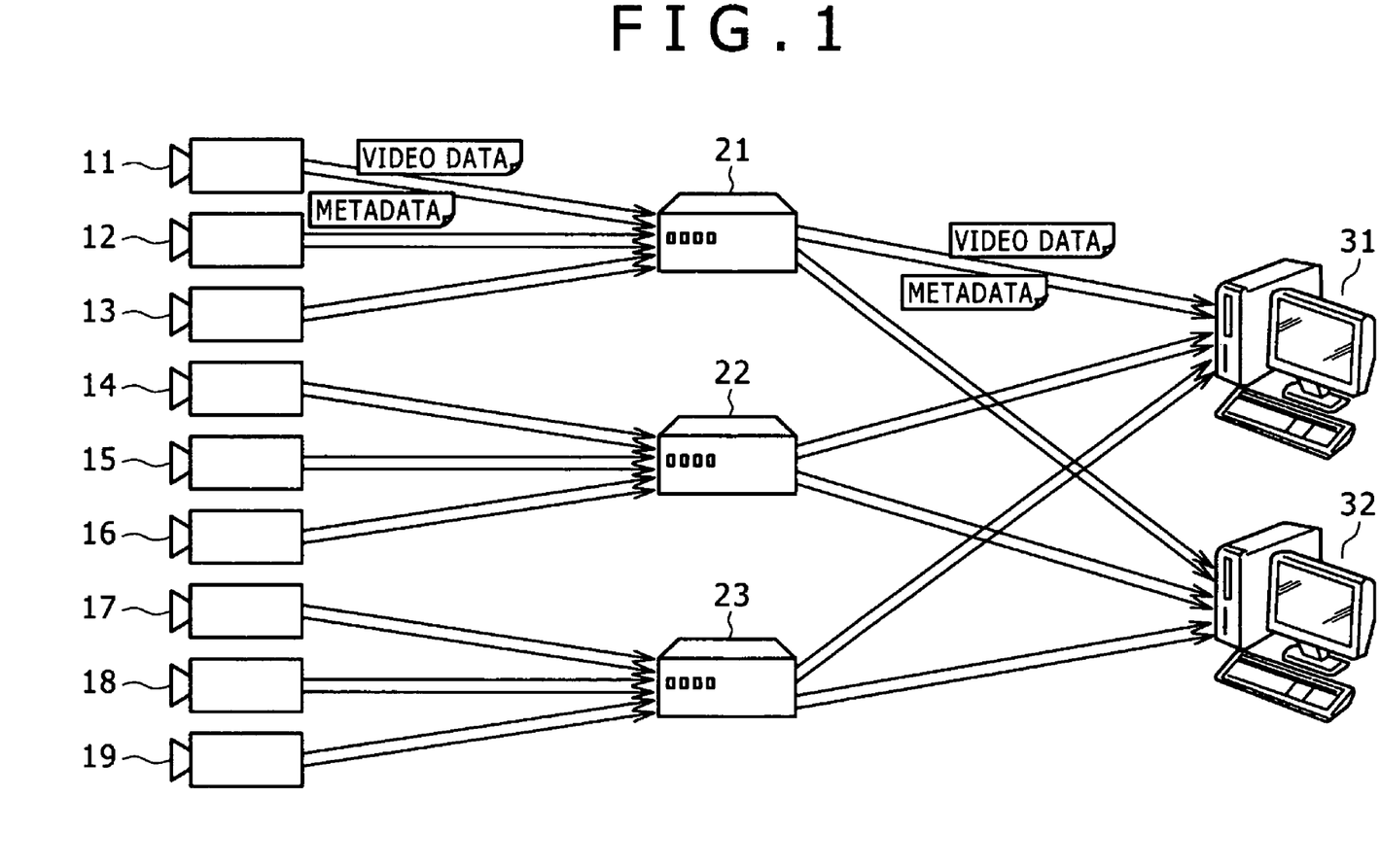
FIG. 1 is a schematic view showing a system configuration of an image processing system according to an embodiment of the present invention.

FIG. 1 is a schematic view showing a system configuration of an image processing system according to an embodiment of the present invention. In this embodiment, a plurality of network cameras 11, 12, 13, . . . , 19 are prepared, and are connected to servers 21, 22 and 23 through a network. Although this embodiment shown in FIG. 1 adopts a constitution in which outputs from the three network cameras are supplied to corresponding one of the servers, this constitution is merely an example. Thus, the present invention is not limited to this constitution. The servers 21, 22 and 23 can transmit data to each of client terminals 31 and 32. Note that, a network dedicated to a monitoring system or the Internet may be used as the network.

Each of the network cameras 11 to 19 is an image pickup device which includes an image pickup section for capturing a monitored image, and outputs video data on the image captured with the image pickup section. In addition, each of the network cameras 11 to 19 in the image processing system of this embodiment includes a metadata generating section for generating metadata as information on the monitored image thus captured, and outputs the metadata generated by the metadata generating section. The metadata is information representing a coordinate position within a range in which the monitored images moves, or information obtained by detecting a state of the monitored image such as a state of the motion of the monitored image. In this embodiment, the metadata is generated in the form of text data representing a coordinate position, a state of the monitored image or the like. Note that, although all the prepared network cameras 11 to 19 may generate the metadata, respectively, alternatively, only a part of the network cameras 11 to 19 may include the metadata generating section.

Here, a description will now be given with respect to the metadata generated in the network camera. The metadata is one becoming complementary information for video data and audio data. The metadata, for example, contains the following information.

(i) Object information (Information obtained as a result of detecting a moving body within the network camera. The information contains therein an ID, an X-coordinate, a Y-coordinate, and a size when a physical object recognized as a moving body is decided as the object).

(ii) Time data on an image.

(iii) Pan-tilt information (direction information) of a camera.

(iv) Positional information of a camera.

(v) Signature information for authorization of an image.

In the following explanation, especially, an example using the object information and the time data will be described below.

The object information contained in the metadata is described in the form of binary data and has the minimum data size. Information which is obtained by developing the object information from the metadata to a meaningful data structure such as a structure is described herein as "the object information".

Alarm information is information obtained by filtering the object information to which the metadata is developed. The alarm information is obtained by analyzing the metadata of a plurality of frames to calculate a speed from a change in moving body position, by checking whether or not the moving body moves beyond a certain line, or by analyzing complexly these respects.

The alarm information contains therein the number of persons within an image, and statistics thereof, and can be used as a report function as well.

Data examples contained in the alarm information are enumerated as follows:

(i) The cumulative number of objects.

When a filter using the cumulative number of objects is set, the number of objects corresponding to the filter is recorded in the alarm information.

(ii) Object.

The number of objects corresponding to the filter in the frame concerned.

(iii) Object information corresponding to the filter.

The object information on the object corresponding to the filter. An ID, an X-coordinate, a Y-coordinate, a size, and the like of the object are contained in the object information.

Figure 2:
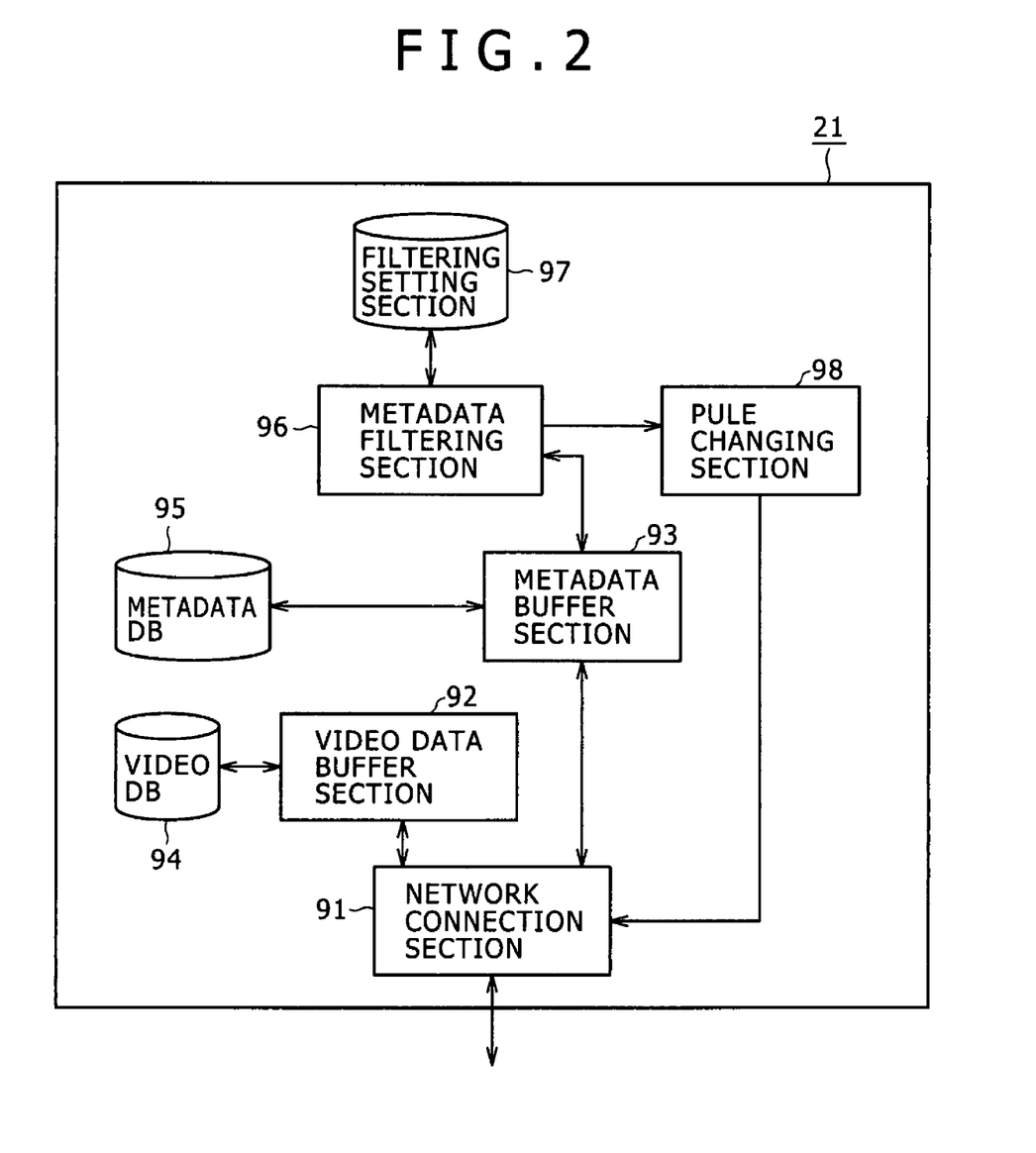
FIG. 2 is a block diagram showing a configuration of a server in the image processing system shown in FIG. 1.

FIG. 2 is a block diagram showing a configuration of the server in the image processing system shown in FIG. 1. Although FIG. 2 shows the configuration of the server 21, each of the other servers 22 and 23 has the same configuration as that of the server 21. The server 21 includes a network connection section 91. Thus, the data transmission can be performed among each of the network cameras 11 to 19, each of the client terminals 31 and 32, and each of the servers 21, 22 and 23. Video data which the network connection section 91 of the server 21 receives from the corresponding one of the network cameras 11, 12 and 13 is sent to a video data buffer section 92, and is then stored in a video database 94. Metadata which the network connection section 91 receives from the corresponding one of the network cameras 11, 12 and 13 is sent to a metadata buffer section 93, and is then stored in a metadata database 95. Large capacity storage means such as a hard disc drive is used as each of the video database 94 and the metadata database 95. The metadata stored in the metadata database 95 is filtered in a metadata filtering section 96, thereby analyzing the contents of the metadata. The contents to be filtered (that is, the contents to be analyzed) are set by a filtering setting section 97. An example of the filtering processing will be described later. When the results about the analysis performed in the metadata filtering section 96 show that it is necessary to change the conditions or the like under which images are captured with the network cameras 11, 12 and 13, respectively, over to the different conditions or the like, a rule changing section 98 issues a command to change an image pickup rule or the like over to another one. The command concerned is sent to each of the network cameras 11, 12 and 13 through the network connection section 91. Data (such as alarm information) obtained as a result of analyzing the metadata is also stored in the metadata database 95.

Note that, the server 21 shown in FIG. 2 adopts the configuration that the video data and the metadata are stored in the video database 94 and the metadata database 95, respectively, and the metadata stored in the metadata database 95 is analyzed in the metadata filtering section 96. However, the server 21 may adopt such a configuration that the display of the video data, the display of the analysis results, and the like can be carried out. In addition, as will be described later, when all the analyses are performed on the client terminal side, the server 21 may not include the metadata filtering section 96, and the like.

Figure 3:
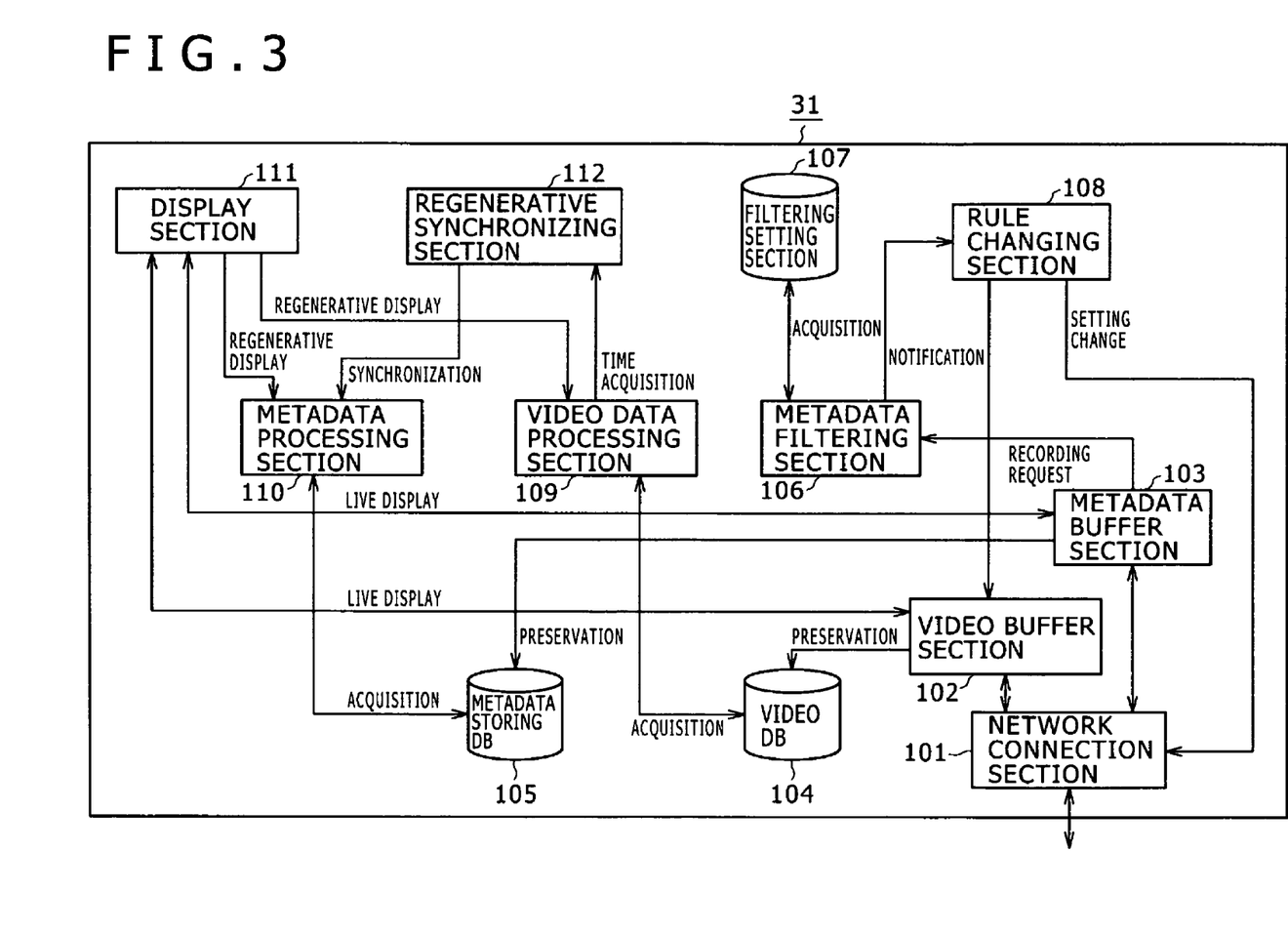
FIG. 3 is a block diagram showing a configuration of a client terminal in the image processing system shown in FIG. 1.

FIG. 3 is a block diagram showing a configuration of the client terminal in the image processing system shown in FIG. 1. Although FIG. 3 shows the configuration of the client terminal 31, the other client terminal 32 has approximately the same configuration as that of the client terminal 31. The client terminal 31 as a terminal apparatus for performing the monitoring includes a network connection section 101. Thus, the data transmission can be performed among each of the servers 21, 22 and 23, each of the network cameras 11 to 19, and each of the client terminals 31 and 32. Video data which the network connection section 101 of the client terminal 31 receives from the corresponding one of the servers 21, 22 and 23 is sent to a video data buffer 102, and is then stored in a video database 104. Metadata which the network connection section 101 receives from the corresponding one of the network cameras 11 to 19 is sent to a metadata buffer section 103, and is stored in a metadata database 105. Large capacity storage means such as a hard disc drive is used as each of the video database 104 and the metadata database 105. The metadata stored in the metadata database 105 is filtered in a metadata filtering section 106, thereby analyzing the contents of the metadata. The contents to be filtered (that is, the contents to be analyzed) are set by a filtering setting section 107. When the results about the analysis performed in the metadata filtering section 106 show that it is necessary to change the conditions or the like under which images are captured with the network cameras 11 to 19, respectively, over to the different conditions or the like, a rule changing section 108 issues a command to change an image pickup rule or the like over to another one. The command concerned is sent to each of the network cameras 11 to 19 through the network connection section 101 to the servers 11, 12 and 13 (or is directly sent to the network cameras 11 to 19 without through any of the servers 11, 12 and 13). Data obtained as a result of analyzing the metadata is also stored in the metadata database 105.

In addition, the client terminal 31 includes a display section 111 for displaying thereon a monitored image or the like. In order that the display section 111 may display thereon the monitored image or the like, the client terminal 31 includes a video data processing section 109 and a metadata processing section 110. Thus, the video data processing section 109 acquires the video data an image corresponding to which is to be displayed from the video database 104. Also, the metadata processing section 110 acquires the metadata synchronized with video data on an image which is to be displayed from the metadata database 105. In order to synchronize the data which the video data processing section 109 manages and the data which the metadata processing section 110 manages with each other in terms of time, a regenerative synchronizing section 112 executes synchronous processing. When a live image data on which is directly supplied from the corresponding one of the servers 21, 22 and 23, or the corresponding one of the network cameras 11 to 19 is displayed on the display section 111, the data is sent from the video buffer section 102 and the metadata buffer 103 to the display section 111, and the display section 111 displays thereon the live image corresponding to the data.

Here, a description will now be given with respect to an example of filtering processing in the metadata filtering sections 96 and 106 provided in each of the servers 21, 22 and 23, and each of the client terminals 11 to 19, respectively.

Here, the filtering processing information is information in which rules in accordance with which the alarm information is generated from the object information are described. The metadata of a plurality of frames is analyzed in the filtering processing, thereby making it possible to perform production of a report, or output based on which information on the number of persons is displayed together with the image. For example, the following four filtering types are prepared.

(i) Appearance: When an object exists in a certain area, this situation becomes an alarm.

(ii) Disappearance: When an object apparatus in a certain area, and then disappears from the certain area, this situation is determined to be an alarm.

(iii) Passing: When a certain line is drawn and an object moves beyond the certain line, this situation is regarded as an alarm.

(iv) Capacity: When persons existing in a certain area are counted, and the number of persons counted exceeds a certain number, this situation is determined to be an alarm.

As described above, the various forms can be applied to the analysis using the metadata, and the display of the analysis results in correspondence to the purpose of performing the monitoring.

Note that, as will be explained in an analysis state which will be described later, a configuration may be adopted such that each of the client terminals includes no function of performing the analysis, but receives and displays the results about the analysis on the server side. Even when each of the client terminals includes the analysis function, the analysis abilities of the analysis functions may be different among the client terminals. In addition, each of the video database 104 and the metadata database 105 provided in each of the client terminals 31 and 32 needs not to perform the large capacity storage that each of the video database 94 and the metadata database 95 provided in each of the servers 21, 22 and 23 performs. Thus, the data necessary for the display processing or the analysis may be acquired from the corresponding one of the servers 21, 22 and 23 whenever the display processing or the analysis is performed.

Next, a description will now be given with respect to the state of the analysis about the metadata performed by utilizing the system configuration in this embodiment which has been described so far with reference to FIGS. 4 to 8. With regard to the servers and the client terminals executing the processing in FIGS. 4 to 8, the specific servers and client terminals are selected from the system configuration shown in FIG. 1. However, other servers and client terminals may also be selected from the system configuration shown in FIG. 1. In addition, a metadata analyzing module shown in each of the corresponding apparatuses generally shows a function section for executing processing for analyzing the metadata. More specifically, for example, in the case of the server, the metadata analyzing module concerned corresponds to the metadata filtering section 96 or the filtering setting section 97 of the server 21 shown in FIG. 2. On the other hand, in the case of the client terminal, the metadata analyzing module concerned corresponds to the metadata filtering section 106 or the filtering setting section 107 of the client terminal 31 shown in FIG. 3.

With respect to the analysis about the metadata, there are the case where the metadata analysis is performed in the server, the case where the metadata analysis is performed in the client terminal, and the case of a combination thereof. These cases will now be described in order.

Figure 4:
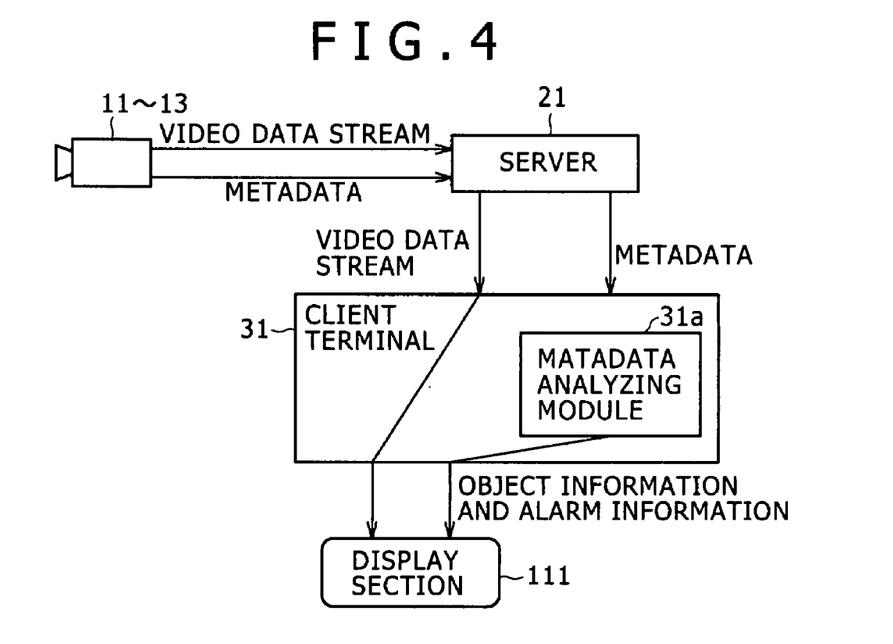
FIG. 4 is an explanatory block diagram showing an example of an analysis performed in the client terminal in the image processing system shown in FIG. 1.

Firstly, an example in which the metadata analysis is performed in the client terminal will now be described with reference to FIG. 4. In this example, after the video data (stream data) and the metadata sent from the network cameras 11, 12 and 13 are temporarily stored in the sever 21, the video data and the metadata are sent to the client terminal 31 in accordance with a request made from the client terminal 31. At this time, the video data and the metadata are delivered to the client terminal 31 so as to be synchronized with each other in terms of time. Also, a metadata analyzing module 31a provided in the client terminal 31 analyzes the metadata, and supplies the object information and the alarm information as the analysis results to the display section 111. Then, the display section 111 displays thereon the object information and the alarm information together with the image. In this case, the network camera which is to perform the metadata analysis is specified. Thus, the server 21 is requested from the client terminal 31 to read out the metadata and the video data for a certain period of time from a certain time to another time. Then, the metadata and the video data thus read out are transferred to the client terminal 31. Thus, after a monitoring person (operator) who manipulates the client terminal sets the conditions or the like under which the metadata analysis is performed in the client terminal by directly manipulating the client terminal, the client terminal can perform the metadata analysis in such a manner. Therefore, the various analysis conditions can be simply performed.

Note that, the following types of outputs, for example, can be expected as the output, about the analysis results in such a case, sent from the metadata analyzing module 31a.

(i) The analysis results are outputted in the form of a report. For example, there are expected an output about a transition in count of the number of persons in a certain area for a specified period of time, and an output or the like about statistical data on the number of persons passed through the certain area. Also, a table form, a graph form, or a simple data file (utilizing a CSV system) is expected as the data form.

(ii) When the video signal is also simultaneously received together with the object information and the alarm information, the alarm information is given in real time to the video signal corresponding to the image. For example, the frame display of the moving body position can be given from the object information to the image, the information on the number of persons counted can be additionally displayed on the picture, or the image of the moving body fitted to the filtering processing can be displayed in the form of a red frame so as to come into prominence.

Figure 5:
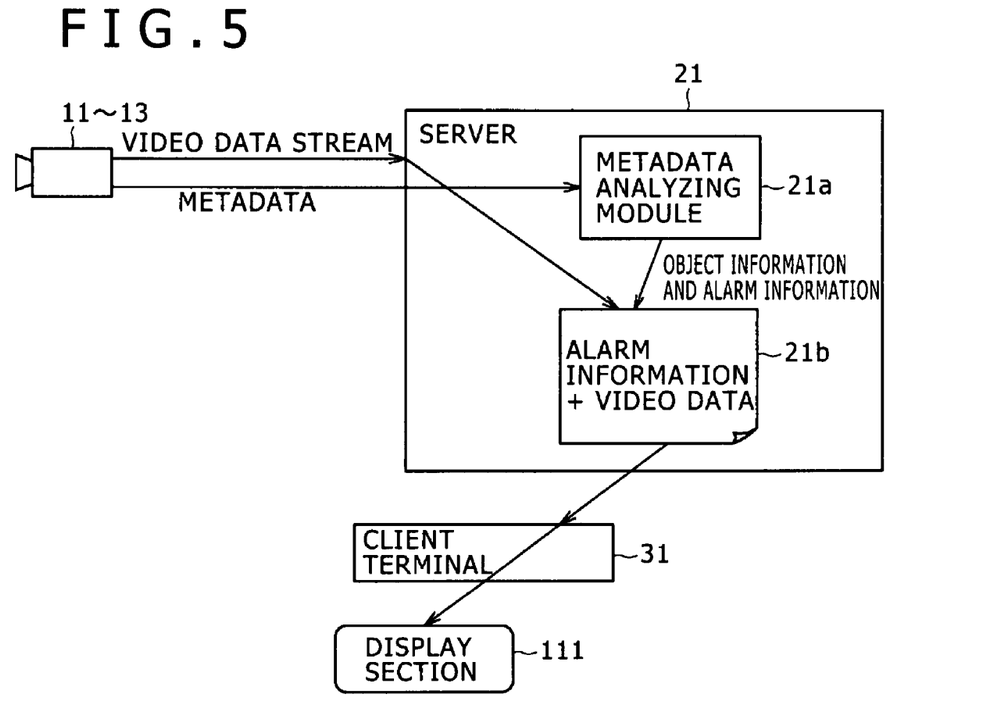
FIG. 5 is an explanatory block diagram showing an example of an analysis performed in the image processing system shown in FIG. 1.

Next, an example in which the metadata analysis is performed in the server will now be described with reference to FIG. 5. In this example, both the video data (stream data) and the metadata sent from the network cameras 11, 12 and 13 are temporarily stored in the server 21. Also, a metadata analyzing module 21a provided in the server 21 analyzes the data, belonging to an arbitrary section in an arbitrary network camera for which a request is made from the client terminal 31, of the video data and the metadata temporarily stored in the server 21. Thus, analysis result information 21b is obtained in which the object information and the alarm information as the analysis results are added to the video data. For example, the analysis result information 21b is obtained in the form of data in which the alarm information is added to a header of the video data. The analysis result information 21b is transmitted to the client terminal 31. Also, the display section 111 provided in the client terminal 31 displays thereon the analysis result information 21b. In this case, the video data to which neither of the object information and the alarm information is added, and the metadata before the analysis needs not be transmitted to the client terminal 31. However, the video data to which neither of the object information and the alarm information is added, and the metadata before the analysis may also be transmitted to the client terminal 31. Performing the metadata analysis within the server in such a manner results in that the processing necessary for the metadata analysis can be concentratedly executed on the server side, and thus it is possible to reduce the burden imposed on the client terminal. Note that, in the case of this example, the data used to determine the details of the analysis, relating to what analysis should be performed, must be sent from the client terminal to the server. Or, the data which is previously analyzed under the predetermined conditions may be stored in the server.

Next, a description will now be given with respect to an example in which both the server and the client terminals perform the metadata analysis with reference to FIG. 6. In this example, the two client terminals 31 and 32 are used. One client terminal 31 is configured as the terminal having a high performance of analyzing the metadata. On the other hand, the other client terminal 32 is configured as the terminal having a low performance of analyzing the metadata (or as the terminal not having the function of analyzing the metadata). Also, the video data (stream data) and the metadata from the network cameras 11, 12 and 13 are temporarily stored in the server 21. The data, belonging to an arbitrary section in an arbitrary network camera for which a request is made from the client terminal 31, of the video data and the metadata temporarily stored in the server 21 is sent to the client terminal 31. In this case, the data from the network cameras 11, 12 and 13 may not be temporarily stored in the server 21, but may be directly sent to the client terminal 31.

In the one client terminal 31, a metadata analyzing module 31a analyzes the metadata. Also, the metadata analyzing module 31a supplies the object information and the alarm information as the analysis results together with the video data to the display section 111 provided in the client terminal 31. Then, the display section 111 displays thereon the object information and the alarm information together with the image corresponding to the video data.

In addition, the metadata analyzing module 21a provided in the server 21 also analyzes the metadata, and obtains the analysis result information 21*b* in which the object information and the alarm information as the analysis results are added to the video data. The server 21 transmits the analysis result information 21*b* to the other client terminal 32. Also, the display section 111 provided in the client terminal 32 displays thereon the analysis result information 21*b*. The server and the client terminals distributively analyze the metadata in correspondence to the abilities of the client terminals, which results in that it is possible to execute the processing suitable for the abilities of the client terminals, and thus it is also possible to improve the flexibility in constructing of the image processing system.

In addition, the conditions under which the metadata analyzing module 21*a* in the server 21 analyzes the metadata, and the conditions under which the metadata analyzing module 31*a* of the client terminal 31 analyzes the metadata can be made different from each other. As a result, a plurality of different analyses can be performed for one monitored image, and thus the various analyses become possible.

Figure 6:
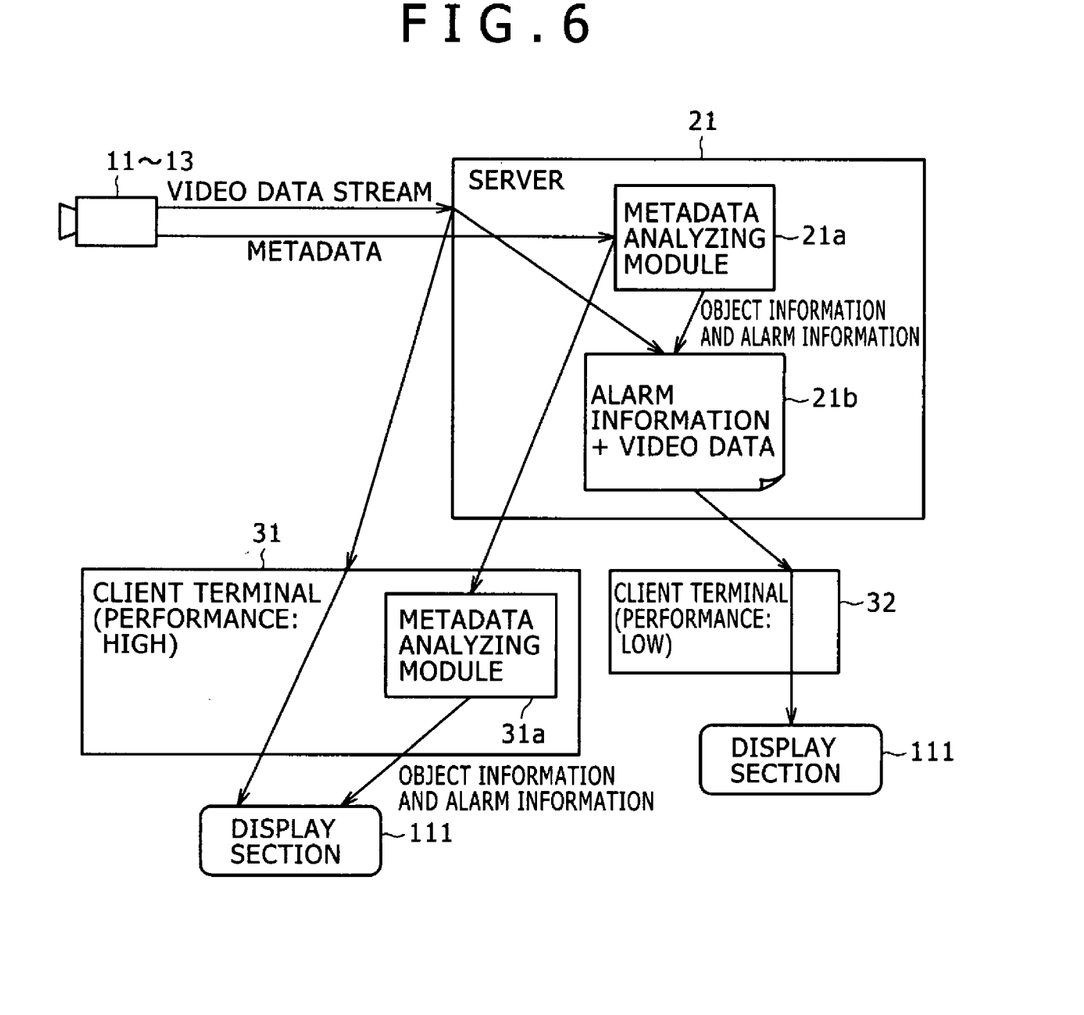
FIG. 6 is an explanatory block diagram showing an example in which an analysis is distributively performed between the server and a plurality of client terminals in the image processing system shown in FIG. 1.

Here, when the processing for analyzing the metadata or the like is distributively executed in the manner as shown in FIG. 6, it may be determined whether the server acquires the information on the performance of each of the client terminals and delivers the metadata to each of the client terminals as it is, or the server delivers the analysis results to each of the client terminals as they are. That is to say, the server acquires the information on the performance from each of the client terminals, and determines the information to be delivered.

For example, an argument as described below is taken for an option of a command based on an HTTP for the server from the client terminal.

/image?ClientPerformance=X

X=H: High (the performance is enough, and thus a request to transmit the metadata is made)

X=M: Middle (the performance is enough, and thus a request to transmit the metadata is made)

X=L: low (since the performance is low, only the analysis results about the metadata analysis are requested)

Also, the server determines the performance information indicated by the command, changes the data to be delivered over to another one, and delivers the another one to the client terminal.

The determination for the change-over, for example, is stated as follows:

(i) The case where the performance of the client terminal is high: The metadata is delivered to the client terminal as it is.

(ii) The case where the performance of the client terminal is middle: The metadata is delivered to the client terminal as it is.

(iii) The case where the performance of the client terminal is low: The object information and the alarm information are generated from the metadata, and are given to the header of the video data corresponding to the image, and the resulting video data is transmitted to the client terminal.

The server automatically determines the information to be delivered in correspondence to the performance of the client terminal in the manner as described above. As a result, it becomes possible to execute the satisfactory processing corresponding to the performance of the client terminal connected to the image processing system.

Figure 7:
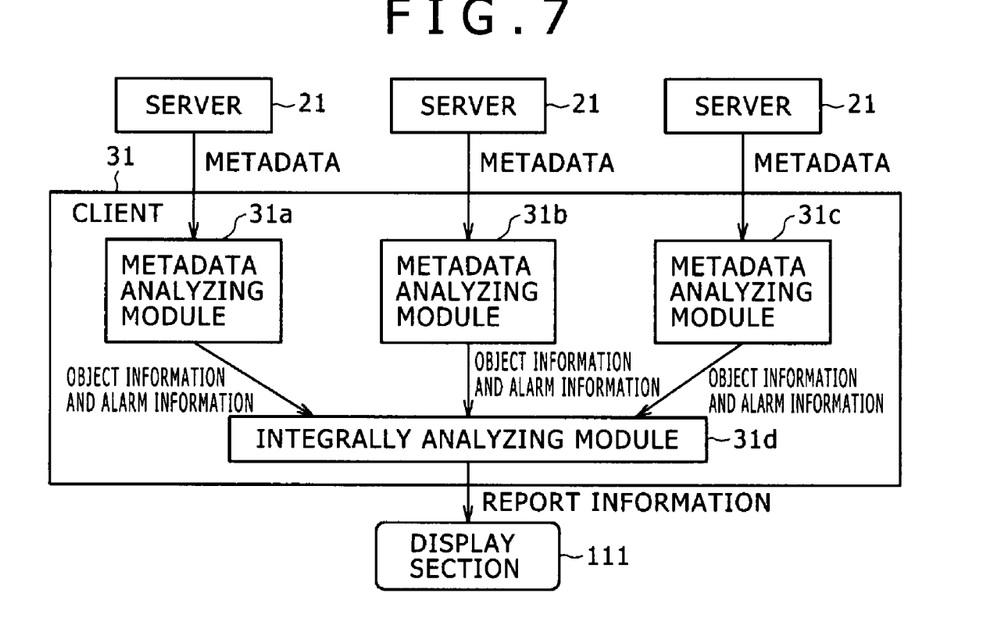
FIG. 7 is an explanatory block diagram showing an example of a plurality of servers in the image processing system shown in FIG. 1.

Next, a description will now be given with respect to an example in which one client terminal 31 simultaneously analyzes the metadata stored in a plurality of servers 21, 22 and 23, respectively, with reference to FIG. 7. In this example, the client terminal 31 includes metadata analyzing modules 31*a*, 31*b* and 31*c* for analyzing the metadata from the three servers 21, 22 and 23, respectively. The client terminal 31 also includes a module 31*d* for integrating the analysis results in the metadata analyzing modules 31*a*, 31*b* and 31*c*. The integrating module 31*d* obtains report information integrated with the alarm information and the object information as the analysis results. Also, the display section 111 in the client terminal 31 displays thereon the resulting report information. Note that, although the example of FIG. 7 shows no transmission of the stream data on the image, the video data may also be transmitted from each of the servers 21, 22 and 23 (or the server making a request), thereby displaying the video data together with the report information on the display section 111.

The processing can be executed in the manner as described above, which results in that the alarm information of a plurality of servers can be collected, and thus the more complicated analysis can be carried out. For example, the number of persons counted by the network cameras, which watch the same place, of the network cameras corresponding to a plurality of servers can be summed up, or the analysis about a traffic line in a store which is monitored by a plurality of network cameras can be carried out.

Next, a description will now be given with respect to an example in which a plurality of client terminals distributively analyze the metadata with reference to FIG. 8. In this example, metadata 21*c* stored in the server 21 is divided into the first half and the second half. Thus, the processing for the metadata analysis which takes a lot of time is made to be completed for a short period of time.

Figure 8:
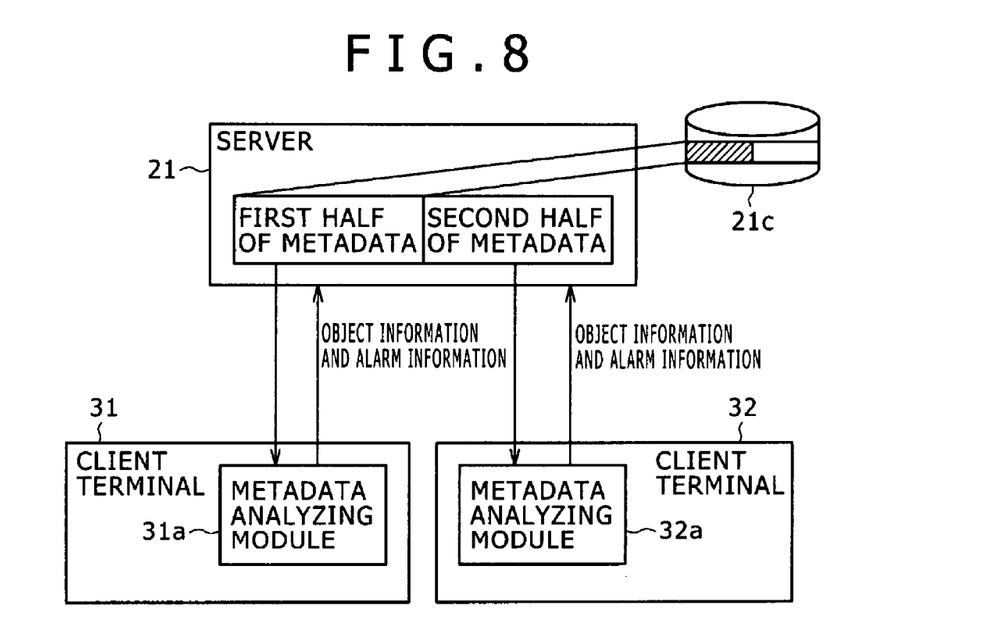
FIG. 8 is an explanatory block diagram showing an example of analyses simultaneously performed in a plurality of client terminals in the image processing system shown in FIG. 1.

In the example shown in FIG. 8, the first half of the metadata is delivered to one client terminal 31, and a metadata analyzing module 31*a* provided in the client terminal 31 analyzes the first half of the metadata. On the other hand, the second half of the metadata is delivered to the other client terminal 32, and a metadata analyzing module 32*a* provided in the client terminal 32 analyzes the second half of the metadata. The analysis results (the object information and the alarm information) obtained in the client terminals 31 and 32, respectively, are sent to the server 21. Also, the server 21 concentratedly manages the analysis results themselves.

A concrete example in which such processing is executed is stated as follows. For example, if seven client terminals are connected to the image processing system when the metadata for seven days is analyzed, the metadata for twenty four hours per one client terminal is transmitted from the server. As a result, the seven client terminals can analyze the metadata for the seven days, respectively. In this case, the server 21 can integrate the metadata analysis results from the respective client terminals, thereby producing the report.

The example of FIG. 8 shows the case where a plurality of client terminals distributively analyze the metadata. However, one of the plurality of client terminals which execute the distributed processing may be made the server itself, and the server may also analyze the metadata.

In addition, the distributed processing for the metadata analysis which has been described so far may adopt a constitution in which the load states in the respective client terminals are acquired in real time, and the distributed processing state is made variable in real time.

For example, in order to avoid the concentration of the loads on a certain server, the alarm information is transmitted to only a part, of the client terminals, having the low performance, and the metadata before the metadata analysis is transmitted to each of the other client terminals. As a result, it is possible to avoid the concentration of the loads on the certain server. This operation is performed in real time. Thus, the alarm information is transmitted to the client terminal to which the heavy load is applied, while the metadata is transmitted to the client terminal to which the light load is applied. As a result, the optimal load distribution can be dynamically carried out.

In addition, it is also possible to make up for the lowness of the performance of the client terminal. That is to say, in general, the performance of the client apparatus is lower than that of the server apparatus. Also, the heavy load may be temporarily applied to a multi-task type client apparatus. In such a case as well, up to the generation of the alarm information is temporarily performed on the server side, thereby making it possible to make up for the lowness of the performance of the client terminal.

It should be understood by those skilled in the art that various modifications, combination, sub-combinations and alterations may occur depending on design requirements and other factors insofar as they are within the scope of the appended claims or the equivalents thereof.

What is claimed is:

1. An image processing system comprising:
   an image pickup device, a server for storing therein video data outputted from said image pickup device;
   an image being captured with said image pickup device and being outputted in a form of the video data from said image pickup device; and
   a terminal apparatus to which the video data is transmitted from said server;
   wherein said image pickup device including:
   a video data generating section configured to capture an image, and generating video data on the image; and
   a metadata generating section configured to generate metadata representing information on an image of an object of monitoring;
   wherein said server including;
   a video data storing section configured to store therein the video data supplied from said image pickup device; and
   a metadata storing section configured to store therein the metadata supplied from said image pickup device;
   in which said server comprises an analyzing section configured to analyze the metadata stored in said metadata storing section,
   in which said image processing system comprises a plurality of terminal apparatuses having different data throughputs including a first terminal apparatus having a low data throughput and a second terminal apparatus having a high data throughput, and
   in which during operation said server obtains performance information of a respective terminal apparatus and supplies either the metadata stored in said metadata storing section of said server or the analysis result in said analyzing section of said server thereto depending upon the obtained performance information such that said server supplies the analysis result in said analyzing section and not the metadata stored in said metadata storing section to the first terminal apparatus having the low data throughput or low performance, and such that said server supplies the metadata stored in said metadata storing section to the second terminal apparatus having the high data throughput or high performance so that the metadata is analyzed on the second terminal apparatus side.

2. An image processing system according to claim 1, wherein the analysis is one for detecting whether or not the image has a change agreeing with a predetermined condition, and alarming a change in monitoring range.

3. An image processing system according to claim 1, wherein a number of said terminal apparatuses each include an analyzing section configured to receive the video data and the metadata supplied from said server, and analyzing the metadata supplied thereto.

4. An image processing system according to claim 1, wherein said analyzing section of said server analyzes a part of the metadata, and one of said terminal apparatuses analyzes the remainder of the metadata.

5. A server for image processing system for storing therein video data outputted from an image pickup device, an image being captured with said image pickup device and being outputted in a form of the video data from said image pickup device, and supplying the video data thus stored to a terminal apparatus,
   said server for an image processing system comprising:
   a video data storing section configured to store therein the video data supplied from said image pickup device;
   a metadata storing section configured to store therein metadata supplied from said image pickup device; and
   an analyzing section configured to analyze the metadata stored in said metadata storing section,
   in which said image processing system comprises a plurality of terminal apparatuses having different data throughputs including a first terminal apparatus having a low data throughput and a second terminal apparatus having a high data throughput, and
   in which during operation said server obtains performance information of a respective terminal apparatus and supplies either the metadata stored in said metadata storing section or the analysis result from said analyzing section thereto depending upon the obtained performance information such that said server supplies the analysis result from said analyzing section and not the metadata stored in said metadata storing section to the first terminal apparatus having the low data throughput or low performance, and such that said server supplies the metadata stored in said metadata storing section to the second terminal apparatus having the high data throughput or high performance so that the metadata is analyzed on the second terminal apparatus side.

6. An image processing method applied to a monitoring system including an image pickup device, a server for storing therein video data outputted from said image pickup device, an image being captured with said image pickup device and being outputted in a form of the video data from said image pickup device, and a terminal apparatus to which the video data is transmitted from said server, said image processing method comprising the steps of:
   capturing an image with said image pickup device, and generating metadata representing information on an object of monitoring by said image pickup device;
   storing video data and the metadata supplied from said image pickup device in said server; and
   outputting a result of an analysis about the metadata stored in said server,
   in which said system comprises a plurality of terminal apparatuses having different data throughputs including a first terminal apparatus having a low data throughput and a second terminal apparatus having a high data throughput, and
   in which during operation said server obtains performance information of a respective terminal apparatus and supplies either the stored metadata or the analysis result thereto depending upon the obtained performance information such that said server supplies the analysis result and not the stored metadata to the first terminal apparatus having the low data throughput or low performance, and such that said server supplies the stored metadata to the second terminal apparatus having the high data throughput or high performance so that the metadata is analyzed on the second terminal apparatus side.

* * * * *